L. E. SHAW.
AUTOMOBILE TOP SECURING DEVICE.
APPLICATION FILED OCT. 16, 1918.
1,435,182.
Patented Nov. 14, 1922.
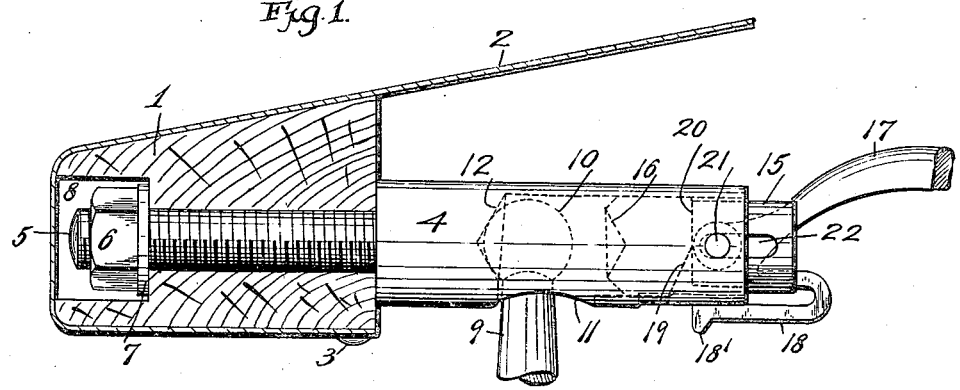
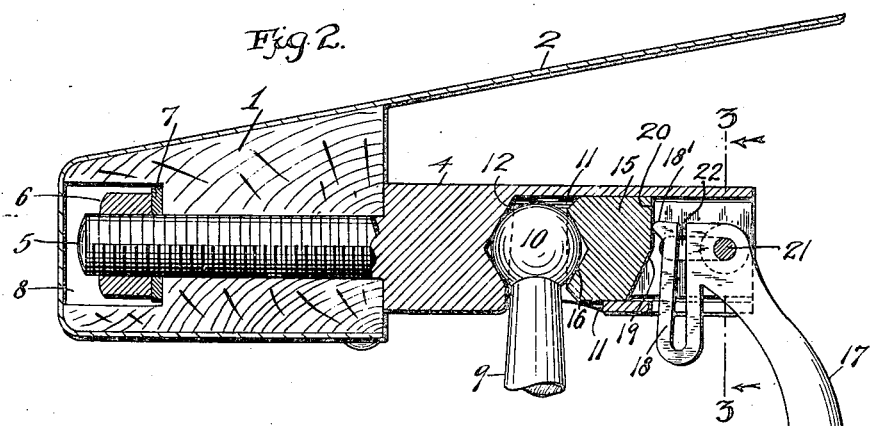
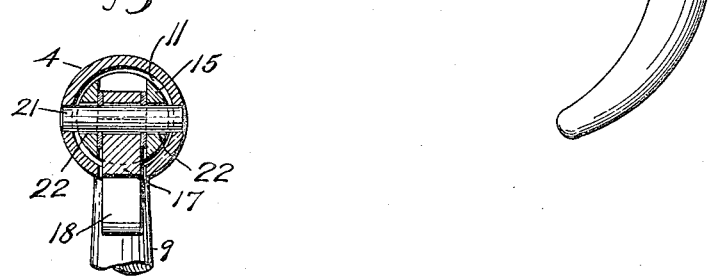
INVENTOR
Louis E. Shaw
BY
ATTORNEYS Patented Nov. 14, 1922.

1,435,182

UNITED STATES PATENT OFFICE.

LOUIS E. SHAW, OF EAST ORANGE, NEW JERSEY, ASSIGNOR TO EDWARD J. BULLWINKEL, OF NEW YORK, N. Y.

AUTOMOBILE TOP-SECURING DEVICE.

Application filed October 16, 1918. Serial No. 258,410.

*To all whom it may concern:*

Be it known that I, LOUIS E. SHAW, a citizen of the United States, residing at East Orange, county of Essex, and State of New Jersey, have invented certain new and useful Improvements in Automobile Top-Securing Devices, fully described and represented in the following specification and the accompanying drawings, forming a part of the same.

This invention relates to certain improvements in devices for rigidly securing or fastening in position to the wind shields used with motor cars and like vehicles the folding tops with which the cars may be equipped.

It is the especial object of the invention to provide a simple device which can be readily and quickly manipulated to firmly secure an automobile top to the wind shield with a simple easy movement and, when so secured, to rigidly hold the parts in place so as to avoid any rattle or other objectionable noise due to motor vibration or other cause.

With this and other objects not specifically referred to in view, the invention consists in certain novel features of construction which, to afford a full understanding of the invention, will be described in connection with the accompanying drawings, in which—

Figure 1 is a side view, partly in section and partly broken away, of the improved securing devices, the parts being shown in unlocked relation, in which position the top may be separated from the shield.

Figure 2 is a view similar to Fig. 1, showing the parts in the position they assume when the parts are locked in position, and Figure 3 is a cross-sectional detail, the section being taken on line 3—3 of Fig. 2.

Referring now to the drawings, the invention is shown in connection with a motor car top of the type which may be folded back to open the car when desired, though it will be understood that if desired the invention may be employed with that class of cars having a partially foldable top, as in the landaulet type.

The automobile top is provided with a front rib or bow which when the top is up is secured to the windshield so that it can be locked rigidly in position. This front bow is marked 1 in the drawings and may be of any suitable material, as wood or light metal, this bow supporting the front end of the top. In the construction shown, the ordinary foldable top 2 is shown, bent around and secured to this bow in any suitable manner, as by screws 3.

In accordance with the invention, means are provided whereby this front bow may be securely and rigidly locked to the windshield, so that when the top is in position a rigid and noiseless structure will be produced. This, of course, may be effected in various ways, but in the best construction the locking means will be secured to and carried by the bow. In the particular construction illustrated there is provided what may be termed a lock support. This support is, as shown, in the form of metal blocks 4, one of which is shown, it being understood that this construction of the parts for locking the top are duplicated on each side of the wind shield. This block is secured to the bow by means of a screw 5 passing through the bow and anchored in position by a nut 6 and washer 7, a recess 8 being provided in the front of the bow for permitting the positioning of the nut.

While the particular devices employed for locking the top to the block may be widely varied, in the best constructions these devices will be such that the locking may be effected by a sliding movement for quick and easy adjustment. In the particular construction illustrated, the upper ends 9 of the side frames of the shield, one of which is shown, is formed to terminate in a ball 10. The locking block 4, before referred to, is recessed vertically and longitudinally at 11 to permit the balls 10 to be inserted therein, and, as shown, the inner face of the recess is formed with a jaw locking wall 12 having a conical locking recess, against which the ball 10 may seat, this conical recess affording an effective locking seat for the ball and at the same time permitting the block, when the lock is broken, to be readily removed from the ball.

Various means may be employed for locking the balls in place and for releasing them from the lock, but in the best constructions these means will preferably include a cam actuated device whereby a quick and easy locking action may be effected, and one which at the same time will hold firmly against the continuous vibration to which this class of devices is subjected, and, furthermore, in the best constructions, the cam locking device will be of such character that when in locked position it will be held under a strong spring tension, so as to provide as rigid a structure as possible. The spring is allowed only a limited movement, otherwise a heavy shock might force the cam piece out far enough to release the ball. With the construction shown, such a shock could only force the cam piece outward a distance equal to the width of the slot in the U-shaped portion 18, this being insufficient to allow the outward passage of the ball 10. While the various concrete embodiments of such cam lock may be varied, a very efficient one is that illustrated in the drawings, Referring particularly to Fig. 2, the locking block 4 is, as before referred to, recessed longitudinally to its rear or right hand end in the figure. In this recess is mounted to slide a cam piece 15, the inner or left hand face of which is provided with a locking jaw in the form of a conical recess 16 corresponding substantially in shape to the jaw 12, before referred to, this shape of the face of the cam piece effecting, when the parts are in closed position, a very effective locking device for the ball.

This cam piece 15 is operated in any suitable manner, and preferably, so as to get a quick throw to effect a rapid locking of the parts. While this may be effected in various ways, in the particular construction illustrated there is provided a cam lever 17 shaped to be conveniently grasped by the hand for operating it, this cam lever being provided with a cam operating tongue 18, this tongue being a spring tongue and being formed with a cam nose 18′, the tongue being formed preferably integrally with the lever by providing, as shown in Fig. 2, a strip of metal substantially of U-form to provide a sufficient spring tension. The nose 18′ of the cam tongue 18 contacts with the rearward face of the cam piece 15 which is, as shown, formed with a slanting cam face 19 and a substantially vertical holding face 20. The operating lever 17 is mounted on a pin 21 rigidly supported in the block 4 and extending through a slot 22 formed in the side walls of the cam piece 15, before referred to, this cam piece being recessed, as shown, to accommodate the operating end of the lever and the cam tongue 18.

In the operation of the device, the lever is moved from the position shown in Fig. 1 to that shown in Fig. 2. As the lever begins its downward movement, the nose 18′ of the cam tongue contacts with the cam face 19 of the cam block 15 and forces the cam block to the left. As the movement continues, the nose of the tongue forces the cam piece into locking position and then slides past the cam face and onto the horizontal locking face of the cam block, and the parts are so proportioned that in this position of the parts the block is in locked position. The spring tension of the tongue securely holds the block rigidly in position, and the parts are not affected by the motor vibration. With this construction, furthermore, a very quick and rapid throw of the block is effected, and a rapid adjustment of the parts secured, which is desirable for convenience in securing automobile tops.

It will be seen that a very simple and efficient construction has been devised for securing a quick locking of the top to the wind shield. It will be understood that the invention includes various changes which may be made in the specific construction shown and described and that such changes are within the scope of the invention as defined in the appended claims.

What is claimed is:

1. In a device of the character described, the combination with a top bow, a wind shield supporting device, a sliding cam block carried from the top bow and having a jaw clamping face for locking the top bow to the shield support, and a lever for throwing the block into locking position with a quick snap action and holding the block in rigid locked position, the construction being such as to prevent the movement of the block out of locked position until the lever has been actuated.

2. In a device of the character described, the combination of a top bow, a wind shield supporting device, a sliding locking cam carried from the top bow, and a rocking lever for giving the cam a quick throw to effect a quick and rigid locking of the bow to the shield supporting device.

3. In a device of the character described, the combination of a top bow, a locking support carried thereby, a wind shield supporting frame, a sliding cam clamp on the locking support having a jaw clamping face and a cam face, and a spring locking lever operating against the cam face for giving the clamp a quick movement to effect a rigid locking of the bow to the shield supporting frame.

4. In a device of the character described, the combination of a top bow, a locking support carried thereby, a wind shield supporting frame, said locking support being provided with a jaw face, a sliding clamp having a co-operating jaw face and a cam face, and a lever for operating the clamp to lock the shield frame between the jaws with a quick snap action.

5. In a device of the character described, the combination of a top bow, a locking support carried thereby having a jaw face, a wind shield supporting frame including a ball member, a sliding clamp having a jaw face and a cam face, and a lever for operating the clamp to lock the ball between the jaws with a quick snap action.

6. In a device of the character described, the combination of a top bow, a locking support carried thereby, a wind shield frame, a sliding clamp, and an operating lever having a spring tongue for sliding the clamp to rigidly lock the locking support to the shield frame.

7. In a device of the character described, the combination of a top bow, a locking support carried thereby, a wind shield frame, a sliding cam clamp, and a rocking operating lever having a spring cam tongue for sliding the clamp to rigidly lock the locking support to the frame.

8. In a device of the character described, the combination of a top bow, a wind shield supporting device, a sliding locking clamp carried from the top bow, an operating lever having a spring for sliding the clamp to rigidly lock the top bow and the shield supporting device, and means for limiting the movement of the spring.

In testimony whereof, I have hereunto set my hand.

LOUIS E. SHAW.